US010284424B2

United States Patent
Saitoh

(10) Patent No.: US 10,284,424 B2
(45) Date of Patent: May 7, 2019

(54) NON-TRANSITORY COMPUTER-READABLE MEDIUM, COMMUNICATION DEVICE, COMMUNICATION SYSTEM, AND COMMUNICATION METHOD

(71) Applicant: FUJI XEROX CO., LTD., Tokyo (JP)

(72) Inventor: Kazutaka Saitoh, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 287 days.

(21) Appl. No.: 15/216,173

(22) Filed: Jul. 21, 2016

(65) Prior Publication Data

US 2017/0279679 A1   Sep. 28, 2017

(30) Foreign Application Priority Data

Mar. 24, 2016  (JP) .................................. 2016-059694

(51) Int. Cl.
G06F 15/173 (2006.01)
H04L 12/24 (2006.01)
H04L 12/26 (2006.01)

(52) U.S. Cl.
CPC ...... *H04L 41/0816* (2013.01); *H04L 41/0645* (2013.01); *H04L 43/0811* (2013.01)

(58) Field of Classification Search
CPC .......................... H04L 41/0816; H04L 43/0811
USPC ........................................................ 709/224
See application file for complete search history.

(56) References Cited

U.S. PATENT DOCUMENTS

| | | | | | |
|---|---|---|---|---|---|
| 5,790,558 | A | * | 8/1998 | Nakamura ......... | G05B 19/4063 714/704 |
| 5,870,540 | A | * | 2/1999 | Wang .................. | G06F 11/0709 714/43 |
| 6,397,245 | B1 | * | 5/2002 | Johnson, II ......... | G06F 11/2294 709/203 |
| 7,620,848 | B1 | * | 11/2009 | Tanner ................ | G06F 11/0709 709/224 |
| 8,095,632 | B2 | * | 1/2012 | Hessmer .............. | H04L 69/329 709/223 |
| 8,145,789 | B1 | * | 3/2012 | Stamler ............... | H04L 41/0672 709/244 |
| 8,199,638 | B2 | * | 6/2012 | Taylor ................. | H04L 12/5601 370/228 |
| 8,392,548 | B1 | * | 3/2013 | Goldschlager ........ | H04L 41/069 709/223 |
| 8,929,206 | B2 | * | 1/2015 | Markwart ............. | H04L 41/08 370/216 |
| 9,055,424 | B1 | * | 6/2015 | Gravette ............... | H04W 4/20 |

(Continued)

FOREIGN PATENT DOCUMENTS

JP        2012-044573 A        3/2012

Primary Examiner — Imad Hussain
(74) Attorney, Agent, or Firm — Oliff PLC

(57) ABSTRACT

A non-transitory computer readable medium stores a program causing a computer to execute a process for communicating. The process includes: when a connection error with a communication target device occurs, querying by transmitting equipment information acquired from the communication target device to a communication management server that manages information related to connection availability with the communication target device and procedures for connection errors; and displaying a connection availability with the communication target device or a procedure for the connection error, according to a result of the querying.

4 Claims, 16 Drawing Sheets

(56) References Cited

U.S. PATENT DOCUMENTS

| | | | | |
|---|---|---|---|---|
| 2003/0149889 A1* | 8/2003 | Wookey | H04L 41/0654 | 726/3 |
| 2004/0103210 A1* | 5/2004 | Fujii | H04L 45/00 | 709/239 |
| 2004/0162092 A1* | 8/2004 | Marsico | H04M 3/42153 | 455/463 |
| 2004/0170174 A1* | 9/2004 | Marsico | H04L 51/38 | 370/392 |
| 2004/0205244 A1* | 10/2004 | Marsico | H04L 51/38 | 709/245 |
| 2004/0208501 A1* | 10/2004 | Saunders | H04B 10/0793 | 398/9 |
| 2004/0208507 A1* | 10/2004 | Saunders | H04B 10/0793 | 398/19 |
| 2005/0185589 A1* | 8/2005 | Berbam | H04L 29/12952 | 370/241 |
| 2007/0189476 A1* | 8/2007 | Marsico | H04M 3/42153 | 379/142.01 |
| 2007/0294090 A1* | 12/2007 | Thieret | G05B 23/0248 | 705/305 |
| 2009/0044185 A1* | 2/2009 | Krivopaltsev | H04L 29/06 | 717/173 |
| 2009/0320098 A1* | 12/2009 | Roberts | H04L 12/2818 | 726/3 |
| 2010/0259782 A1* | 10/2010 | Kotake | G06F 11/0733 | 358/1.15 |
| 2015/0127820 A1* | 5/2015 | Kitajima | H04L 41/5058 | 709/224 |
| 2015/0382215 A1* | 12/2015 | Huang | H04W 24/08 | 370/252 |
| 2016/0182275 A1* | 6/2016 | Viswanadham | H04B 10/0771 | 398/1 |
| 2016/0209997 A1* | 7/2016 | Lee | G06F 3/0482 | |

* cited by examiner

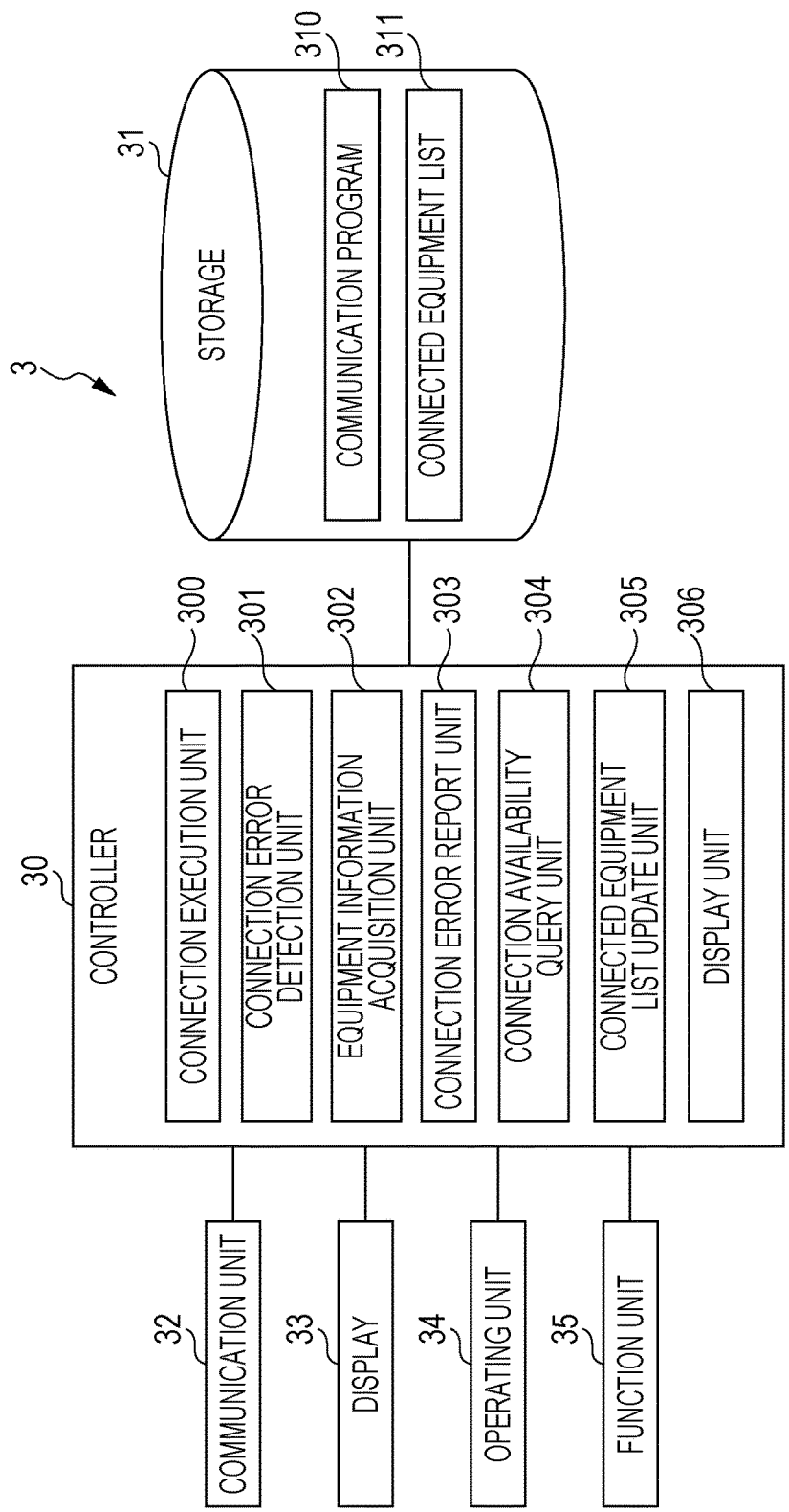

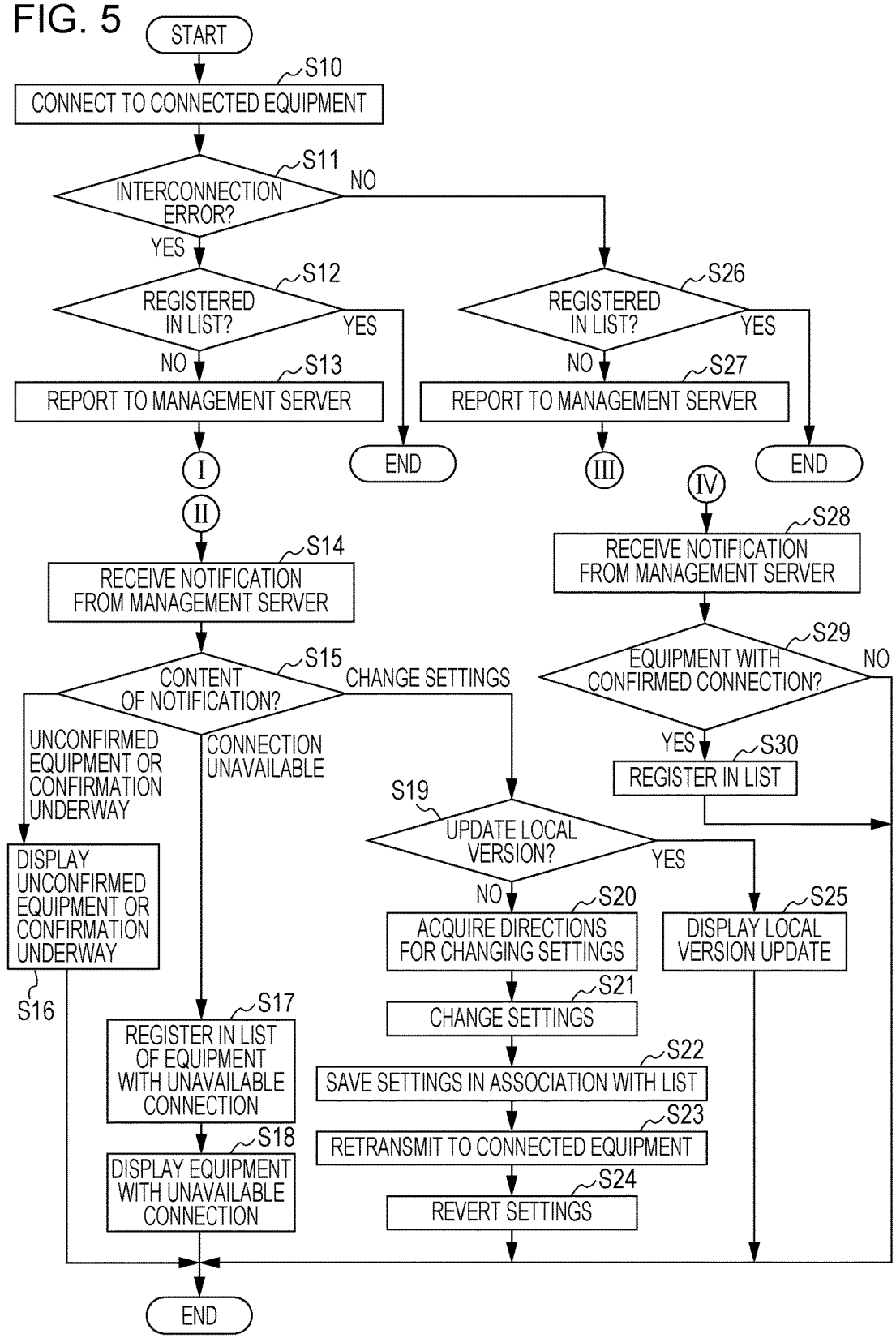

FIG. 9

LOCAL_IPFAX 1.0 CONNECTION CONFIRMATION LIST

| USER NAME | PROTOCOL | VERSION | ERROR NUMBER | REPORT COUNT | PROCEDURE | STATUS |
|---|---|---|---|---|---|---|
| B CORP. | B_IPFAX | ### | | | | NO CONNECTION |
| | | | 400 | 100 | CANNOT CONNECT. | |
| 500 | 501 | | 502 | 503 | 504 | 505 |

FIG. 10A

LOCAL_IPFAX 1.0 CONNECTION CONFIRMATION LIST

| USER NAME | PROTOCOL | VERSION | ERROR NUMBER | REPORT COUNT | PROCEDURE | STATUS |
|---|---|---|---|---|---|---|
| B CORP. | B_IPFAX | ### | | | | CONNECTION UNCONFIRMED |
| | | | 400 | 99 | UNDETERMINED | |
| 500 | 501 | | 502 | 503 | 504 | 505 |

FIG. 10B

| USER NAME | PROTOCOL | VERSION | ERROR NUMBER | REPORT COUNT | PROCEDURE | STATUS |
|---|---|---|---|---|---|---|
| B CORP. | B_IPFAX | ### | | | | CONNECTION UNCONFIRMED |
| | | | 400 | 100 | INSPECTION UNDERWAY | |
| 500 | 501 | | 502 | 503 | 504 | 505 |

FIG. 11

LOCAL_IPFAX 1.0 CONNECTION CONFIRMATION LIST

| USER NAME | PROTOCOL | VERSION | ERROR NUMBER | REPORT COUNT | PROCEDURE | STATUS |
|---|---|---|---|---|---|---|
| B CORP. | B_VoIPGW | ### | | | | CONNECTION UNCONFIRMED |
| | | | 300 | 1 | CONFIRMING VERSION | |
| C CORP. | C_VoIPGW | ### | | | | CONNECTION UNCONFIRMED |
| | | | 300 | 1 | CONFIRMING VERSION | |
| 500 | 501 | | 502 | 503 | 504 | 505 |

FIG. 12A

INSPECTION RESULT: CHANGE SETTINGS
LOCAL_IPFAX 1.0 CONNECTION CONFIRMATION LIST

| USER NAME | PROTOCOL | VERSION | ERROR NUMBER | REPORT COUNT | PROCEDURE | STATUS |
|---|---|---|---|---|---|---|
| B CORP. | B_VoIPGW | ### | | | | CONNECTION UNCONFIRMED |
| | | | 300 | 5 | SETTINGS CHANGE REQUIRED | |
| 500 | 501 | | 502 | 503 | 504 | 505 |

FIG. 12B

| USER NAME | PROTOCOL | VERSION | ERROR NUMBER | REPORT COUNT | PROCEDURE | STATUS |
|---|---|---|---|---|---|---|
| B CORP. | B_VoIPGW | ### | | | | CONNECTION UNCONFIRMED |
| | | | 300 | 6 | SETTINGS CHANGE REQUIRED | |
| 500 | 501 | | 502 | 503 | 504 | 505 |

FIG. 13A

INSPECTION RESULT: UPDATE VERSION
LOCAL_IPFAX 1.0 CONNECTION CONFIRMATION LIST

| USER NAME | PROTOCOL | VERSION | ERROR NUMBER | REPORT COUNT | PROCEDURE | STATUS |
|---|---|---|---|---|---|---|
| C CORP. | C_VoIPGW | ### | | | | CONNECTION UNCONFIRMED |
| | | | 300 | 10 | VERSION UPDATE REQUIRED | |

| USER NAME | PROTOCOL | VERSION | ERROR NUMBER | REPORT COUNT | PROCEDURE | STATUS |
|---|---|---|---|---|---|---|
| C CORP. | C_VoIPGW | ### | | | | CONNECTION UNCONFIRMED |
| | | | 300 | 11 | VERSION UPDATE REQUIRED | |

LOCAL_IPFAX 1.0 CONNECTION CONFIRMATION LIST

| USER NAME | PROTOCOL | VERSION | ERROR NUMBER | REPORT COUNT | PROCEDURE | STATUS |
|---|---|---|---|---|---|---|
| A CORP. | A_IPFAX | ### | | | | |
| | | | 000 | 999 | | |
| | | | | | | |
| 500 | 501 | | 502 | 503 | 504 | 505 |

FIG. 14B

| USER NAME | PROTOCOL | VERSION | ERROR NUMBER | REPORT COUNT | PROCEDURE | STATUS |
|---|---|---|---|---|---|---|
| A CORP. | A_IPFAX | ### | | | | CONNECTION CONFIRMED |
| | | | 000 | 1000 | | |
| | | | | | | |
| 500 | 501 | | 502 | 503 | 504 | 505 |

FIG. 15A

LOCAL_IPFAX 1.0 CONNECTION CONFIRMATION LIST

| USER NAME | PROTOCOL | VERSION | ERROR NUMBER | REPORT COUNT | PROCEDURE | STATUS |
|---|---|---|---|---|---|---|
| B CORP. | B_IPFAX | ### | | | | NO CONNECTION |
| | | | 400 | 100 | CANNOT CONNECT. | |
| 500 | 501 | | 502 | 503 | 504 | 505 |

FIG. 15B

| USER NAME | PROTOCOL | VERSION | ERROR NUMBER | REPORT COUNT | PROCEDURE | STATUS |
|---|---|---|---|---|---|---|
| B CORP. | B_VoIPGW | ### | | | | CONNECTION UNCONFIRMED |
| | | | 300 | 5 | SETTINGS CHANGE REQUIRED | |
| 500 | 501 | | 502 | 503 | 504 | 505 |

CREATE DIRECTIONS — 506

FIG. 15C

| USER NAME | PROTOCOL | VERSION | ERROR NUMBER | REPORT COUNT | PROCEDURE | STATUS |
|---|---|---|---|---|---|---|
| C CORP. | C_VoIPGW | ### | | | | CONNECTION UNCONFIRMED |
| | | | 300 | 10 | VERSION UPDATE REQUIRED | |
| 500 | 501 | | 502 | 503 | 504 | 505 |

FIG. 18

| ERROR CODE | APPLICABLE | ERROR CONTENT | COMMENT |
|---|---|---|---|
| 000 | | NORMAL END | |
| 100 | ○ | CALL CONNECTION | REQUEST ERROR CONNECTION PROCEDURE MISMATCH |
| 200 | | BUSY | ALREADY COMMUNICATING |
| 300 | ○ | AFTER CALL CONNECTION, LOCAL CONNECTIVITY-RELATED ERROR DETECTED DURING COMMUNICATION | INVALID DATA RECEIVED TIMEOUT |
| 400 | ○ | AFTER CALL CONNECTION, DISCONNECTION FROM TERMINAL DURING COMMUNICATION | |
| 500 | | AUTHENTICATION FAILURE | INCORRECT PASSWORD |
| 600 | | NO CAPABILITY | MEDIA MISMATCH |
| 700 | | AFTER CALL CONNECTION, LOCAL ERROR DETECTED DURING COMMUNICATION | PACKET TRANSMISSION ERROR |

NON-TRANSITORY COMPUTER-READABLE MEDIUM, COMMUNICATION DEVICE, COMMUNICATION SYSTEM, AND COMMUNICATION METHOD

CROSS-REFERENCE TO RELATED APPLICATIONS

This application is based on and claims priority under 35 USC 119 from Japanese Patent Application No. 2016-059694 filed Mar. 24, 2016.

BACKGROUND

Technical Field

The present invention relates to a non-transitory computer-readable medium, a communication device, a communication system, and a communication method.

Summary

According to an aspect of the invention, there is provided a non-transitory computer readable medium storing a program causing a computer to execute a process for communicating. The process includes: when a connection error with a communication target device occurs, querying by transmitting equipment information acquired from the communication target device to a communication management server that manages information related to connection availability with the communication target device and procedures for connection errors; and displaying a connection availability with the communication target device or a procedure for the connection error, according to a result of the querying.

BRIEF DESCRIPTION OF THE DRAWINGS

Exemplary embodiments of the present invention will be described in detail based on the following figures, wherein:

FIG. 3 is a block diagram illustrating an exemplary configuration of a communication device according to a first exemplary embodiment;

FIG. 5 is a flowchart illustrating operations of a communication device;

FIG. 9 is an example of a connection confirmation list;

FIGS. 10A and 10B are examples of a connection confirmation list;

FIG. 11 is an example of a connection confirmation list;

FIGS. 12A and 12B are examples of a connection confirmation list;

FIGS. 13A and 13B are examples of a connection confirmation list;

FIGS. 14A and 143 are examples of a connection confirmation list;

FIGS. 15A to 15C are examples of a connection confirmation list;

FIG. 18 is a diagram illustrating an example of an error code table.

DETAILED DESCRIPTION

First Exemplary Embodiment (Configuration of Communication System)

Figure 1:
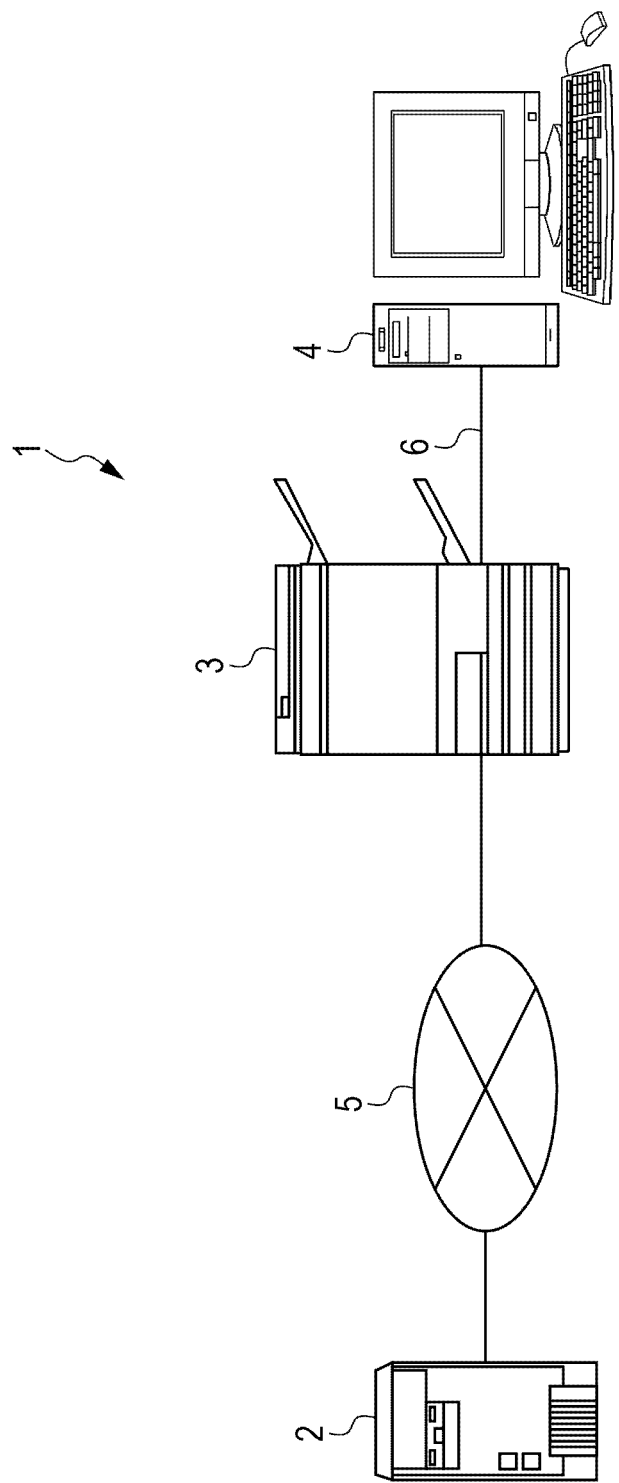
FIG. 1 is a schematic diagram illustrating an example of a configuration of a communication system according to a first exemplary embodiment.

FIG. 1 is a schematic diagram illustrating an example of a configuration of a communication system according to a first exemplary embodiment.

The communication system 1 includes a communication management server 2, a communication device 3, and a communication target device 4. The communication management server 2 and the communication device 3 are communicably connected to each other over a network 5. Also, the communication device 3 and the communication target device 4 are communicably connected to each other over a transmission medium 6.

The communication management server 2 is a device for providing information related to interconnection between the communication device 3 and the communication target device 4. In other words, the communication management server 2 manages information about the interconnection between the communication device 3 and the communication target device 4, and in response to a query from the communication device 3 when an interconnection error occurs, replies to indicate that interconnection is available, that interconnection is available if the settings are changed, or that connection is unavailable. A detailed configuration of the communication management server 2 will be discussed later, but a personal computer (PC) may be used as the communication management server 2, for example. Note that a connection error according to the present invention refers to an inexpedience in the communication process, such as a call connection error, a local connectivity-related error detected during communication after a call connection, an error of disconnection from a terminal similarly during communication, or simply an inability to connect because of a busy state, with no problems regarding interconnectivity itself, for example. Additionally, a connection error may also be caused by a hardware malfunction, such as a disconnected cable between the communication device 3 and the communication target device 4, downtime of the network 5, or a hardware-related malfunction in the communication device 3 or in the communication target device 4.

The communication device 3 is a multi-function device including printing functions, copying functions, facsimile transmitting and receiving functions, and scanning functions, for example. Note that the communication device 3 is not limited to being a device equipped with all of the above functions, and may also be equipped with facsimile functions but not equipped with other functions, for example. A detailed configuration of the communication device 3 will be discussed later.

The communication target device 4 communicates with the communication device 3 and exchanges various information, and is a multi-function device like the communication device 3 discussed above, or a terminal such as a PC.

The network 5 is a communication medium used to exchange various information, and is exemplified by the Internet or a local area network (LAN), for example. Also, for the transmission medium 6, a wired connection realized by an electrical cable or an optical cable, or a wireless connection realized by infrared rays or radio waves may be used, for example.

(Configuration of Communication Management Server)

Figure 2:
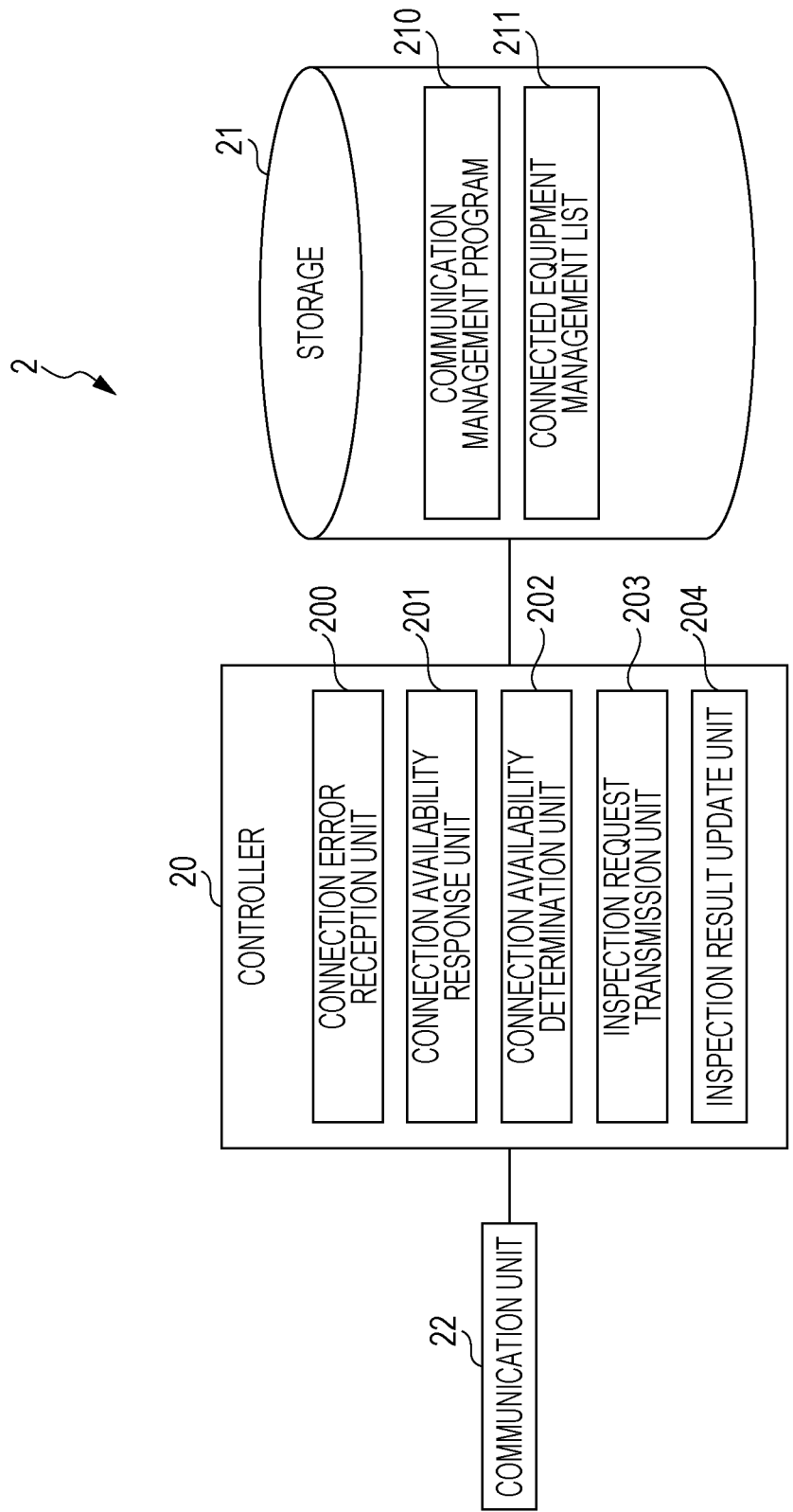
FIG. 2 is a block diagram illustrating an exemplary configuration of a communication management server according to a first exemplary embodiment.

FIG. 2 is a block diagram illustrating an exemplary configuration of the communication management server 2 according to the first exemplary embodiment.

The communication management server 2 is equipped with a controller 20, which is made up of a CPU and the like, and which controls each component of the communication management server 2 and also executes various programs, storage 21, which is made up of a recording medium such as a hard disk drive (HDD) or flash memory, and which serves as an example of a storage device that stores information, and a communication unit 22 that communicates with external equipment over the network 5.

The controller 20, by executing a communication management program 210 discussed later, functions as units such as a connection error reception unit 200, a connection availability response unit 201, a connection availability determination unit 202, an inspection request transmission unit 203, and an inspection result update unit 204.

The storage 21 is a storage device made up of a recording medium such as an HDD or flash memory, and stores information such as the communication management program 210 which causes the controller 20 to operate as the respective units 200 to 204 discussed above, and a connected equipment management list 211. The connected equipment management list 211 includes information such as version information for the communication target device 4 and the status of the communication target device 4, such as whether or not the communication target device 4 is interconnectable equipment (equipment with a confirmed connection). The connected equipment management list 211 is used when notifying the communication device 3 of a procedure for a connection error.

The connection error reception unit 200 receives a query from the communication device 3 when an interconnection error occurs between the communication device 3 and the communication target device 4. As indicated in the error code table in FIG. 18, for example, there are a variety of connection errors, such as a call connection error, a local connectivity-related error detected during communication after a call connection, an error of disconnection from a terminal similarly during communication, or simply an inability to connect because of a busy state, with no problems regarding interconnectivity itself. When the communication device 3 queries the communication management server 2 for the connection error, the three-digit error code (error number) listed in the first column of the error code table in FIG. 18 is included and transmitted to the communication management server 2.

The connection availability response unit 201, in response to a query from the communication device 3, responds to the communication device 3 with information indicating whether or not the communication target device 4 that the communication device 3 is attempting to connect to is connected equipment that is interconnectable with the communication device 3, a procedure for the connection error, and the like.

The connection availability determination unit 202 receives information such as version information for a communication service of the communication device 3 and the communication target device 4, references the connected equipment management list 211, and determines whether or not the communication device 3 and the communication target device 4 are interconnectable equipment.

If the connection availability determination unit 202 is unable to determine interconnectivity, the inspection request transmission unit 203 transmits a request for an inspection of the connection error to an external entity such as developer support (a service center), for example.

When an inspection result is received from the external entity to which an inspection request was issued, the inspection result update unit 204 updates the connected equipment management list 211 stored in the storage 21 to reflect the inspection result.

(Configuration of Communication Device)

FIG. 3 is a block diagram illustrating an exemplary configuration of the communication device 3 according to the first exemplary embodiment.

The communication device 3 is equipped with components such as a controller 30, which is made up of a CPU and the like, and which controls each component of the communication device 3 and also executes various programs, storage 31, which is made up of a storage medium such as flash memory, and which stores various information, a communication unit 32 that communicates with external equipment over a network, a display 33 such as an LCD, an operating unit 34 such as a keyboard and mouse or a touch panel, and a function unit 35 that executes functions such as scanning and printing functions.

The controller 30, by executing a communication program 310 discussed later, functions as units such as a connection execution unit 300, a connection error detection unit 301, an equipment information acquisition unit 302, a connection error report unit 303, a connection availability query unit 304, a connected equipment list update unit 305, and a display unit 306.

The storage 31 stores information such as the communication program 310 that causes the controller 30 to operate as the respective units 300 to 306 discussed above, and a connected equipment list 311. The connected equipment list 311 includes information such as whether or not the communication target device 4 is interconnectable equipment (equipment with a confirmed connection), is equipment that is interconnectable if settings are changed, or is equipment that is not interconnectable (connection unavailable).

The connection execution unit 300 executes interconnection with the communication target device 4 through the communication unit 32.

The connection error detection unit 301 detects a connection error that occurs when the communication device 3 and the communication target device 4 are interconnected or attempting to interconnect.

The equipment information acquisition unit 302 acquires equipment information from an interconnected communication target device 4. As an example, in the case of communication by IP fax, the equipment information acquisition unit 302 acquires, as the equipment information, version information for software such as the communication protocol.

When the connection error detection unit 301 detects a connection error, the connection error report unit 303 reports the version information of the local device (that is, the communication device 3) and the communication target device 4, the error code of the connection error that occurred, and the like to the communication management server 2.

The connection availability query unit 304 queries the communication management server 2 about whether or not the communication target device 4 that the communication device 3 is attempting to connect to is interconnectable equipment.

The connected equipment list update unit 305 adds new information to the connected equipment list 311 stored in the storage 31 and updates the stored contents.

The display unit 306 causes the display 33 to display information such as a procedure for a connection error when an interconnection error occurs.

(Operations of Communication Device)

Next, the action of the present exemplary embodiment will be described. First, operations of the communication device 3 will be described by following the flowchart in FIG. 5.

FIG. 5 is a flowchart illustrating operations of the communication device 3.

First, when the communication device 3 connects to the communication target device 4, the connection execution unit 300 transmits a call connection request to the communication target device 4 (S10).

A method of acquiring equipment information for the communication target device 4 will now be described. The following description takes Internet Protocol facsimile (IP fax) as an example, but a communication method according to an exemplary embodiment of the present invention is not limited to IP fax, and other communication services are also applicable.

Figure 4A:
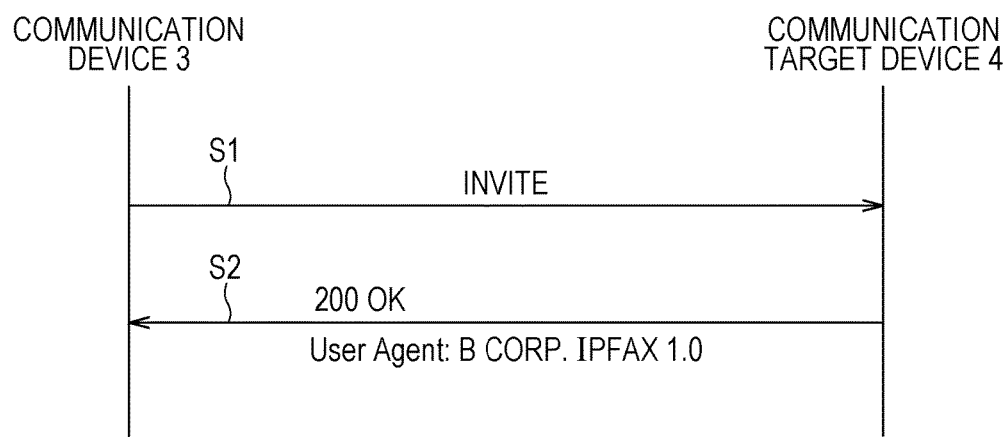
FIGS. 4A and 4B are sequence diagrams illustrating a connection request operation from a communication device to a communication target device.
Figure 4B:
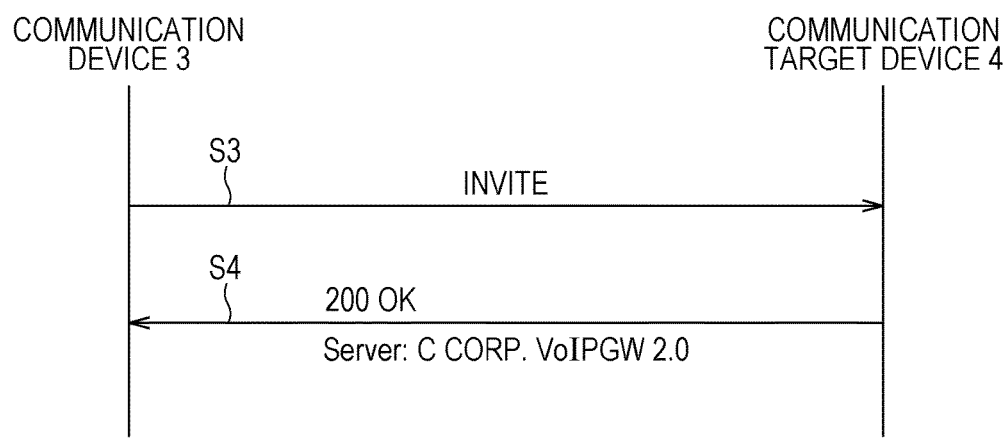

FIGS. 4A and 4B are sequence diagrams illustrating a connection request operation from the communication device 3 to the communication target device 4. The INVITE request is a request for initiating a session.

In FIG. 4A, the communication target device 4 issues the response "200 OK (call connection established)" in response to the INVITE request (S2). Consequently, the equipment information acquisition unit 302 acquires equipment information for the communication target device 4. At this point, the communication target device 4 is IP fax version 1.0 of B Corp. Meanwhile, in FIG. 4B, the response "200 OK (call connection established)" (S4) is returned in response to the call connection request (INVITE request) (S3), and the communication target device 4 is Voice over Internet Protocol (VoIP) gateway (GW) version 2.0 of C Corp.

The connection error detection unit 301 receives the response from the communication target device 4, and detects that an interconnection error has occurred (S11). If the occurrence of an interconnection error is detected (S11; Yes), next, the connection error detection unit 301 references the connected equipment list 311 stored in the storage 31 and confirms whether or not the communication target device 4 is registered in the connected equipment list 311 (S12).

If the communication target device 4 is not registered in the connected equipment list 311 (S12; No), the connection availability query unit 304 queries the communication management server 2 about whether or not the communication target device 4 is interconnectable equipment (S13). Also, at this point, the connection error report unit 303 reports an error to the communication management server 2, together with equipment information about the communication device 3 itself and the communication target device 4, and the error code.

Herein, the error code is a code used as diagnostic data to diagnose a connection error, and is expressed as a three-digit numeral, for example. Error codes are stored in a table in the storage 31.

FIG. 18 illustrates an example of an error code table. As illustrated in FIG. 18, the error code table is made up a three-digit error code, an applicable field in which a circle is marked if the error applies, a field indicating the error content, and a comment field. For example, an error code of "400" indicates an error with the content "after call connection, disconnection from terminal during communication". An error code of "000" indicates "normal end".

In this way, if an interconnection error is detected, and the communication target device 4 is not registered in the connected equipment list 311, the communication device 3 reports version information for the communication device 3 and the communication target device 4 as well as the error code (in this example, the error code "400") to the communication management server 2, and waits for a notification from the communication management server 2.

Meanwhile, if the communication target device 4 is registered in the connected equipment list 311 (S12; Yes), the connected terminal, namely the communication target device 4, is interconnectable equipment, and thus since the error is not due to an interconnectivity issue, the process ends.

Next, if the connection availability query unit 304 receives a notification from the communication management server 2 (S14), a process is conducted according to the notification content (S15).

If the notification content from the communication management server 2 indicates that the communication target device 4 is unconfirmed equipment or equipment for which confirmation is underway, the display unit 306 displays an indication of "unconfirmed equipment or confirmation underway" on the display 33 (S16). Herein, "unconfirmed equipment" indicates that the communication target device 4 is equipment whose interconnectivity is unconfirmed, or that interconnectivity is currently being confirmed because a version change occurred.

Also, if the notification content from the communication management server 2 indicates that the communication target device 4 is equipment for which an interconnection is unavailable (equipment with unavailable connection), the connection availability query unit 304 registers an indication that the communication target device 4 is equipment with an unavailable connection (no connection) in the connected equipment list 311 (S17). In addition, the display unit 306 displays an indication of "connection unavailable" for the communication target device 4 on the display 33 (S18).

Also, if the notification content from the communication management server 2 indicates that interconnection with the communication target device 4 is available if a settings change is made in the communication device 3, the connection availability query unit 304 determines whether or not the content of the settings change is a local version update (S19).

If the content of the settings change is a local version update (S19; No), the connection availability query unit 304 acquires settings change directions that specify the content of the settings change from the communication management server 2 (S20). Subsequently, settings are changed temporarily based on the acquired directions (S21), and the content of the settings change is saved in association with the connected equipment list 311 (S23).

Subsequently, the connection execution unit 300 transmits a call connection request to the communication target device 4 again, in the state of temporarily changed settings (S23). After transmission is completed, the settings are reverted back to the original settings (S24).

Meanwhile, the content of the settings change is a local version update (S19; Yes), the display unit 306 displays an indication of a local version update on the display 33 (S25).

Next, if interconnection is established and ends normally without an interconnection error (S11; No), it is determined whether or not the communication target device 4 is registered in the connected equipment list 311 (S26). If the interconnection ends normally and the communication target device 4 is registered in the connected equipment list 311 (S26; Yes), there are no issues, and thus the process ends.

On the other hand, if interconnection ends normally but the communication target device 4 is not registered in the connected equipment list 311 (S26; No), the connection error report unit 303 reports this state to the communication management server 2 (S27), and waits for a notification from the communication management server 2.

Subsequently, if the connection availability query unit 304 receives a notification from the communication management server 2 (S28), it is determined whether or not the notification content indicates that the communication target device 4 is equipment with a confirmed connection (S29).

If the notification content indicates that the communication target device 4 is equipment with a confirmed connection (S29; Yes), the connection availability query unit 304 registers an indication of this state in the connected equipment list 311 (S30). On the other hand, if the notification content indicates that the communication target device 4 is not equipment with a confirmed connection (S29; No), the process ends.

(First Operation of Communication Management Server: Connection Error and No List Registration)

When a connection error occurs and the communication target device 4 is not registered in the connected equipment list 311, the communication device 3 reports this state to the communication management server 2 (S13 in the flowchart of FIG. 5). Hereinafter, a process of the communication management server 2 that has received a report of a connection error from the communication device 3 will be described by following the flowchart in FIG. 6.

Figure 6:
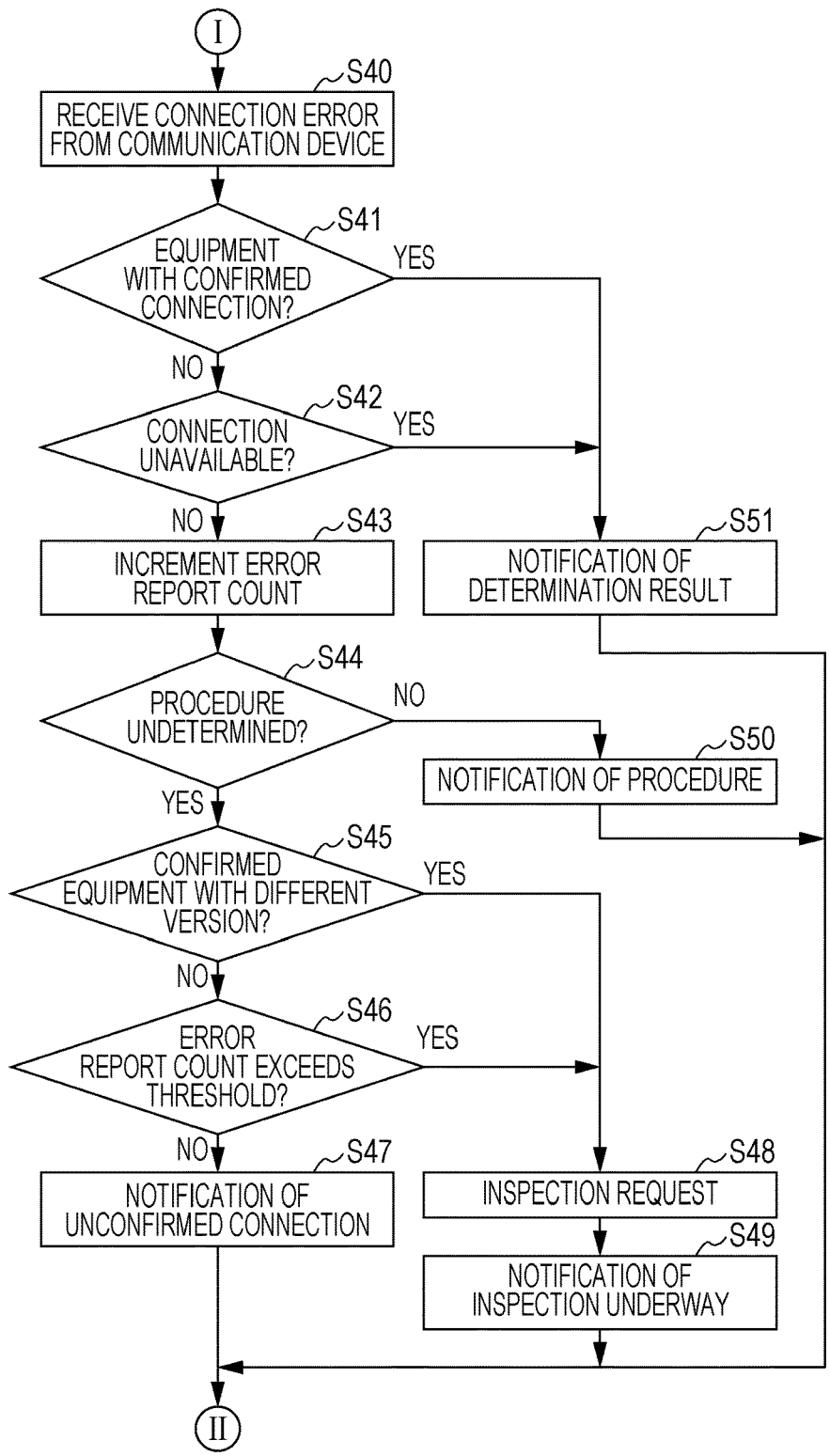
FIG. 6 is a flowchart illustrating operations of a communication management server that has received an error report in a case of a connection error with no list registration.

FIG. 6 is a flowchart illustrating operations of the communication management server 2 that has received an error report in a case of a connection error with no list registration.

If the connection error reception unit 200 of the communication management server 2 receives a report of a connection error from the communication device 3 (S40), the connection availability determination unit 202, based on the received report, references the connected equipment management list 211 to determine first whether or not the communication target device 4 is equipment with a confirmed connection (S41). As a result, if the communication target device 4 is determined to be equipment with a confirmed connection (S41; Yes), the connection availability response unit 201 responds to the communication device 3 with an indication of this result (S51).

On the other hand, if the communication target device 4 is determined not to be equipment with a confirmed connection (S41; No), the connection availability determination unit 202 determines whether or not the communication target device 4 is equipment with an unavailable connection (S42). As a result, if the communication target device 4 is determined to be equipment with an unavailable connection (S42; Yes), the connection availability response unit 201 responds to the communication device 3 with an indication of this result (S51).

FIG. 9 illustrates an example of a connection confirmation list. In the example illustrated in FIG. 9, a user name 500 is "B Corp.", a communication protocol 501 is "IPFAX", an error code (error number) 502 is "400", a report count 503 is "100" reports, a procedure 504 is "Cannot interconnect.", and a status 505 is "no connection". The above indicates that an error occurred with an error code 502 of "400", which is an error of being disconnected from the other terminal for some reason during communication with IPFAX version 1.0 of B Corp. After querying the communication management server 2, the status 505 is "no connection (connection unavailable)", and the procedure 504 is "cannot interconnect". At this point, the connection availability response unit 201 of the communication management server 2 responds to the communication device 3 with an indication that the communication target device 4 is equipment with an unavailable connection.

Meanwhile, if the communication target device 4 is determined not to be equipment with an unavailable connection (S42; No), or in other words, the communication target device 4 is determined not to be equipment with a confirmed connection and also not to be equipment with an unavailable connection, the connection availability determination unit 202 increments the connection error report count (S43). The communication management server 2 is provided with a connection confirmation list inside the connected equipment management list 211, and the error report count is incremented in this connection confirmation list.

FIGS. 10A and 10B illustrate an example of a connection confirmation list. For example, as illustrated in FIG. 10A, the user name 500 is "B Corp.", the communication protocol 501 is "IPFAX", the error code 502 is "400", the report count 503 is "99" reports, the procedure 504 is "undetermined", and the status 505 is "connection unconfirmed". In this way, when the report count 503 is "99" reports, receiving an error report causes the report count 503 to be incremented by 1, and the report count 503 becomes "100" reports, as illustrated in FIG. 10B.

Next, it is determined whether or not the procedure for the connection error is undetermined (S44). For example, as illustrated in FIG. 10A, if the procedure 504 is "undetermined" (S44; Yes), next it is determined whether or not the communication target device 4 is equipment with a confirmed connection but with a different version (S45).

FIG. 11 illustrates an example of another connection confirmation list. In the upper rows of FIG. 11, the user name 500 is "B Corp.", the communication protocol 501 is "VoIPGW", the error code 502 is "300", the report count 503 is "1" report, the procedure 504 is "confirming version", and the status 505 is "connection unconfirmed". For B Corp., the error code 502 is "300", and the content of this error indicates that after the call connection, a local connectivity-related error was detected during communication. For example, although interconnection has been confirmed for VoIPGW version 1.0 of B Corp., communication with version 2.0 resulted in an error, and connectivity is being confirmed on the communication management server 2. Thus, the procedure 504 is "confirming version", and the status 505 is "connection unconfirmed". In this case, the communication device 3 is notified that the communication target device 4 is equipment with an unconfirmed connection (confirming version) (S47).

If the version is not different (S45; No), it is determined whether or not the error report count that has been counted so far exceeds a predetermined threshold (S46). As a result, if the error report count does not yet exceed the threshold (S46; No), the connection availability response unit 201 notifies the communication device 3 that the communication target device 4 is equipment with an unconfirmed connection (S47).

On the other hand, if the error report count exceeds the threshold (S46; Yes), the inspection request transmission unit 203 transmits an inspection request to external developer support (S48). Subsequently, the connection availability response unit 201 responds to the communication device 3 with an indication that an inspection is underway (S49).

For example, if the threshold of the error report count is 100 reports, as illustrated in FIG. 10B, the incremented error report count 503 is "100" reports and exceeds the threshold, and thus a request for an inspection into the cause of the error is issued to developer support. Additionally, whereas in FIG. 10A the procedure 504 was set to "undetermined", since the error report count 503 has exceeded the threshold, in FIG. 10B the procedure 504 is replaced by "inspection underway".

Also, in the example illustrated in FIGS. 10A and 10B, the error code 502 is "400", which is an error of being disconnected from the other terminal for some reason during communication with IPFAX version 1.0 of B Corp., but since the communication target device 4 is determined to be equipment with an unconfirmed connection as a result of examination at the communication management server 2, the communication device 3 is notified of this result, and the result is displayed by the display unit 306 of the communication device 3.

Note that if the communication target device 4 is equipment with a confirmed connection but with a different version (S45; Yes), an inspection request is transmitted to developer support (S48), and the communication device 3 is notified that an inspection is underway (S49). Also, if the procedure is not undetermined, and instead a procedure has been decided (S44; No), the communication device 3 is notified of the procedure (S50).

FIGS. 12A and 12B illustrate an example of a connection confirmation list. In the FIG. 12A, the user name 500 is "B Corp.", the communication protocol 501 is "VoIPGW", the error code 502 is "300", the report count 503 is "5" reports, the procedure 504 is "settings change required", and the status 505 is "connection unconfirmed". The error report count 503 is incremented by 1 to become "6" reports, as illustrated in FIG. 12B. In this example, interconnection is possible if the settings are changed, and the communication device 3 is notified of directions for the settings change indicating the procedure.

Additionally, FIGS. 13A and 13B illustrate an example of another connection confirmation list. In the example illustrated in FIGS. 13A and 13B, the user name 500 is "C Corp.", the communication protocol 501 is "VoIPGW", the error code 502 is "300", the report count 503 is "10" reports, the procedure 504 is "version update required", and the status 505 is "connection unconfirmed". The error report count 503 is incremented by 1 to become "11" reports, as illustrated in FIG. 13B. In this example, interconnection is possible if the local version is updated, and the communication device 3 is notified that a local version updated is required as the procedure.

After a notification is transmitted from the communication management server 2 to the communication device 3, the flow proceeds to a process by the communication device 3 that received the notification (S14 in FIG. 5).

(Second Operation of Communication Management Server: Normal End and No List Registration)

When a connection error does not occur and the connection ends normally, but the communication target device 4 is not registered in the connected equipment list 311, the connection error report unit 303 of the communication device 3 reports this state to the communication management server 2 (S27 in the flowchart of FIG. 5). Hereinafter, a process of the communication management server 2 receiving a report from the communication device 3 at this point will be described by following the flowchart in FIG. 7.

Figure 7:
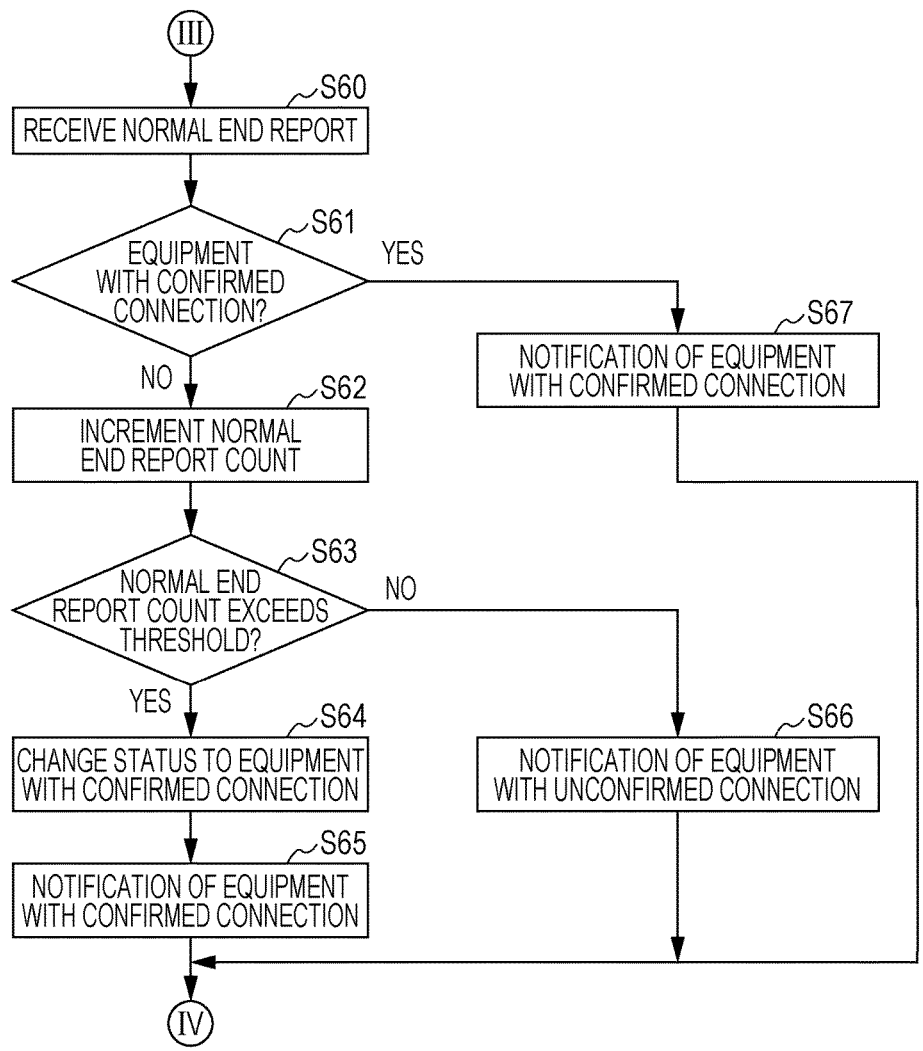
FIG. 7 is a flowchart illustrating operations of a communication management server that has received an error report in a case of a normal end with no list registration.

FIG. 7 is a flowchart illustrating operations of the communication management server 2 that has received a report in a case of a normal end with no list registration.

If the connection error reception unit 200 of the communication management server 2 receives a report from the communication device 3 indicating that the connection ended normally but the communication target device 4 is not registered in the connected equipment list 311 (S60), the connection availability determination unit 202 determines whether or not the communication target device 4 is equipment with a confirmed connection (S61).

As a result, if the communication target device 4 is determined not to be equipment with a confirmed connection (S61; No), the connection availability determination unit 202 increments a normal end report count (S62).

FIGS. 14A and 14B illustrate an example of another connection confirmation list. As illustrated in FIG. 14A, the user name 500 is "A Corp.", the communication protocol 501 is "IPFAX", the error code 502 is "000", and the report count 503 is "999" reports. Herein, the error code 502 of "000" indicates a normal end. At this point, when the normal end report count is incremented by 1, the report count becomes "1000" reports, as illustrated in FIG. 14B.

Next, it is determined whether or not the normal end report count exceeds a threshold (S63). If the normal end report count is determined to exceed the threshold (S63; Yes), the number of reports of successful communication is taken to be sufficiently large, and the status is changed to equipment with a confirmed connection (S64). Subsequently, the connection availability response unit 201 notifies the communication device 3 that the communication target device 4 is equipment with a confirmed connection (S65).

Herein, for example, if the threshold for the normal end report count is taken to be "1000" reports, in the example of FIGS. 14A and 14B, the report count 503 exceeds the threshold of 1000 reports as a result of being incremented, as illustrated in FIG. 14B, and thus the status 505 is changed to "connection confirmed", and the communication device 3 is notified that the communication target device 4 of A Corp. is equipment with a confirmed connection. Upon receiving the notification that the communication target device 4 is equipment with a confirmed connection, the connection availability query unit 304 of the communication device 3 registers the communication target device 4 as equipment with a confirmed connection in the connected equipment list 311.

On the other hand, if the normal end report count does not exceed the threshold (S63; No), the connection availability response unit 201 responds to the communication device 3 to indicate that the communication target device 4 is equipment with an unconfirmed connection (S66).

Meanwhile, if the communication target device 4 for which a normal end report was received is determined to be equipment with a confirmed connection (S61; Yes), the connection availability response unit 201 responds to the communication device 3 to indicate that the communication target device 4 is equipment with a confirmed connection (S67). Note that, likewise in this case, upon receiving the notification that the communication target device 4 is equipment with a confirmed connection, the connection availability query unit 304 of the communication device 3 registers the communication target device 4 as equipment with a confirmed connection in the connected equipment list 311.

After a notification is transmitted from the communication management server 2 to the communication device 3, the flow proceeds to a process by the communication device 3 that received the notification (S28 in FIG. 5).

(Third Operation of Communication Management Server: Inspection Request Operation)

Next, an operation of the communication management server 2 requesting an external entity such as developer support for an inspection regarding the cause of a connection error will be described by following the flowchart in FIG. 8.

Figure 8:
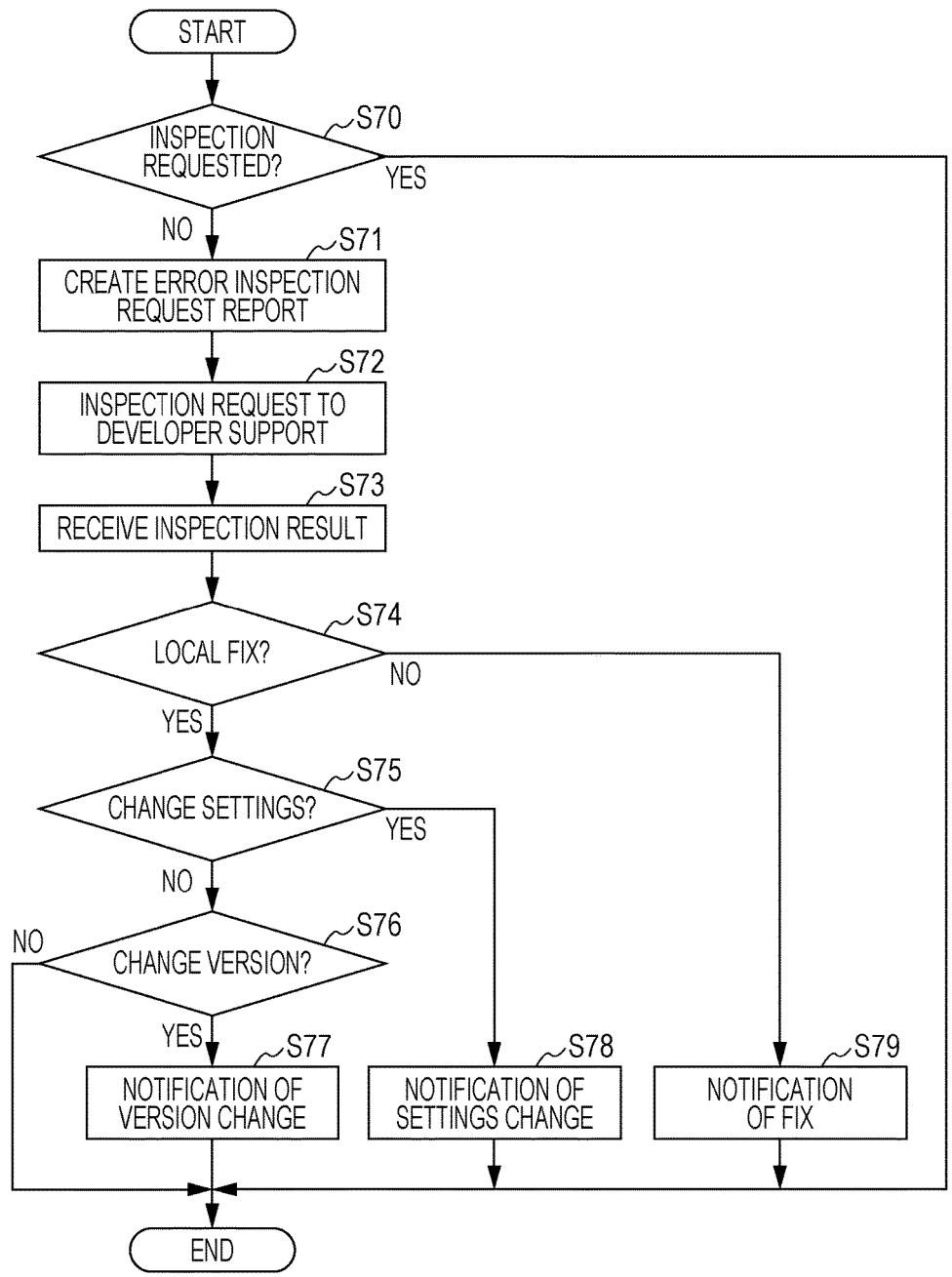
FIG. 8 is a flowchart illustrating an operation of a communication management server requesting an external entity for an inspection.

FIG. 8 is a flowchart illustrating an operation of the communication management server 2 requesting an external entity for an inspection.

First, the inspection request transmission unit 203 of the communication management server 2 determines whether or not an inspection request has been transmitted already (S70). If an inspection request has been transmitted already (S70; Yes), the process ends.

If an inspection request has not been transmitted already (S70; No), the inspection request transmission unit 203 creates a report for requesting an inspection into a connection error (S71). Subsequently, the inspection request transmission unit 203 transmits the connection error inspection request to an external entity such as developer support (S72).

After the inspection by developer support is finished, the inspection request transmission unit 203 receives an inspection result from developer support (S73). The inspection result update unit 204 updates the connection confirmation list in the connected equipment management list 211 to reflect the received inspection result.

FIG. 15 illustrates an example of a connection confirmation list. In FIG. 15A, an inspection result of "cannot interconnect" is reflected in the procedure 504. In FIG. 15B, an inspection result of "settings change required" is reflected in the procedure 504, and directions 506 indicating the content of the settings change are created. Also, in FIG. 15C, an inspection result of "version update required" is reflected in the procedure 504.

Next, it is determined whether or not a local fix is available (S74). In the case of an inspection result indicating "cannot interconnect" as in the example of FIG. 15A, it is determined that a local fix is not available (S74; No). In this case, the connection availability response unit 201 responds to the communication device 3 with an inspection result of "cannot interconnect".

If it is determined that a local fix is available (S74; Yes), it is determined whether or not a settings change is required (S75). In the case of an inspection result indicating "settings change required" as in the example of FIG. 15B, it is determined that a settings change is required (S75; Yes). In this case, the connection availability response unit 201 responds to the communication device 3 to indicate that a settings change is required (S78).

If it is determined that a settings change is not required (S75; No), it is determined whether or not a version update is required (S76). In the case of an inspection result indicating "version update required" as in the example of FIG. 15C, it is determined that a version update is required (S76; Yes). In this case, the connection availability response unit 201 responds to the communication device 3 to indicate a version change (S77).

Effects of First Exemplary Embodiment

According to the present exemplary embodiment, when an interconnection error occurs in the connection to a device that is the communication target of a communication device, an indication of whether or not the communication target device to connect with is connectable equipment is displayed, while in addition, a countermeasure for the interconnection error is presented. As a result, it becomes possible to improve response to version updates and situations of connection failures with equipment having a large number of connections.

Second Exemplary Embodiment

Next, a second exemplary embodiment will be described. In the second exemplary embodiment, a similar process is performed on the communication device 3 side, without querying the communication management server 2. Consequently, in terms of the configuration, it is sufficient for the communication device 3 according to the first exemplary embodiment to be connected to the communication target device 4, as well as another communication device with the same version as the communication device 3, whereas the communication management server 2 may be omitted.

In other words, even if the communication device 3 is a low-performance multi-function device, the communication device 3 is able to receive a connected equipment list and a connected equipment management list from an external entity such as a high-performance multi-function device with the same version of services or a service center, and thus is able to hold a connected equipment information list and address connection errors.

Figure 16:
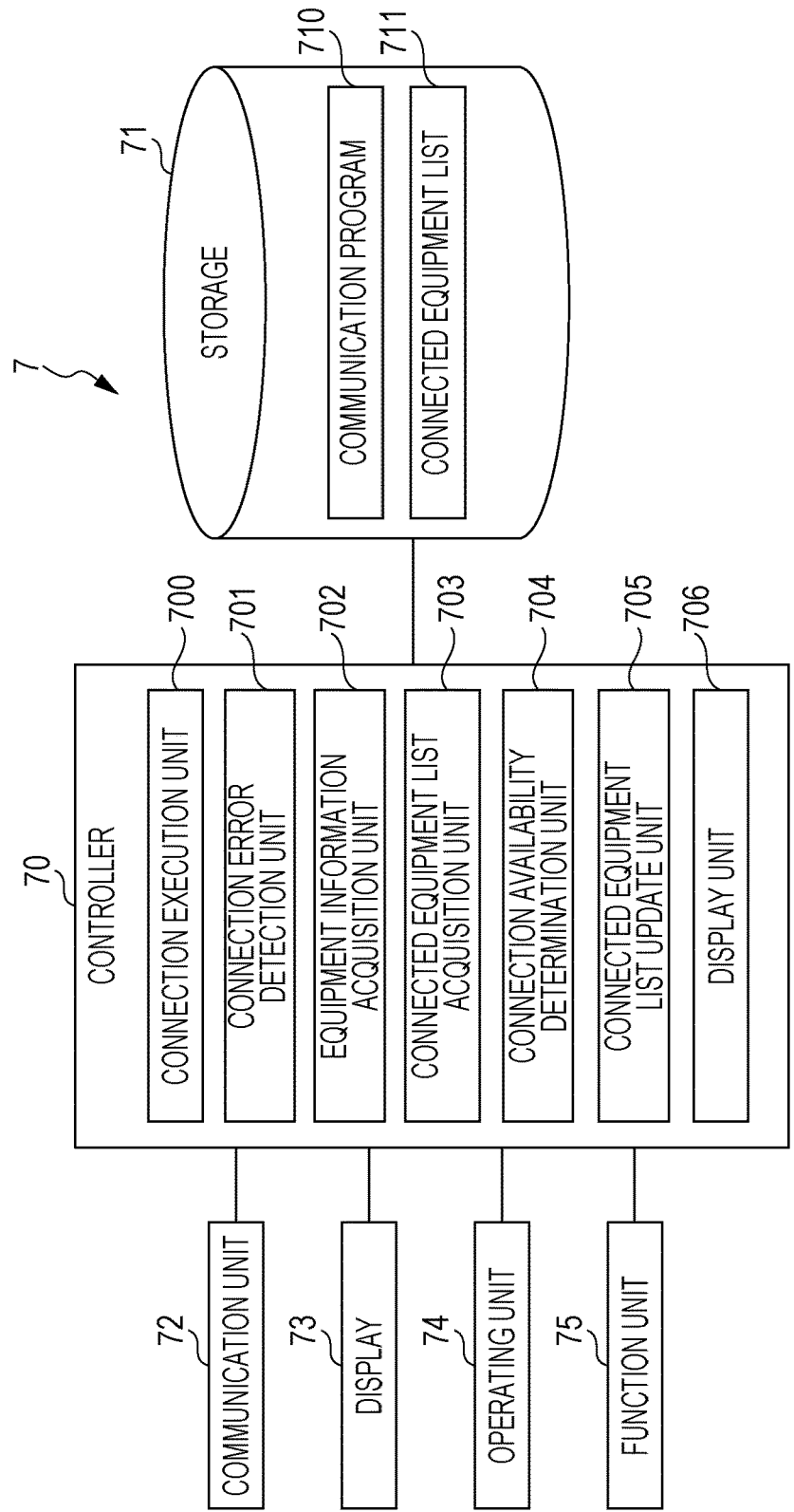
FIG. 16 is a block diagram illustrating an exemplary configuration of a communication device according to a second exemplary embodiment.

FIG. 16 is a block diagram illustrating an exemplary configuration of a communication device 7 according to the second exemplary embodiment.

The configuration of the communication device 7 according to the second exemplary embodiment is approximately similar to the communication device 3 according to the first exemplary embodiment illustrated in FIG. 3. However, in the second exemplary embodiment, since the communication management server 2 may not be queried, the communication device 7 according to the present exemplary embodiment differs from the communication device 3 according to the first exemplary embodiment in the portions related to the communication management server 2. Namely, instead of the connection error report unit 303 and the connection availability query unit 304 in the communication device 3, the communication device 7 is equipped with a connected equipment list acquisition unit 703 and a connection availability determination unit 704.

The connected equipment list acquisition unit 703 acquires a connected equipment list from an external entity such as a high-performance multi-function device with the same version of services, or a service center. The acquired connected equipment list is stored in the storage 71 as the connected equipment list 711.

The connection availability determination unit 704 works similarly to the connection availability determination unit 202 of the communication management server 2 according to the first exemplary embodiment. In other words, when a connection error occurs, the connection availability determination unit 704 determines whether or not the communication target device 4 is connectable equipment, from equipment information about the communication target device 4 acquired by the equipment information acquisition unit 702, and the connected equipment list 711. Other parts of the configuration are similar to the communication device 3 according to the first exemplary embodiment discussed earlier, and thus further description will be reduced or omitted, and operations will be described next.

Figure 17:
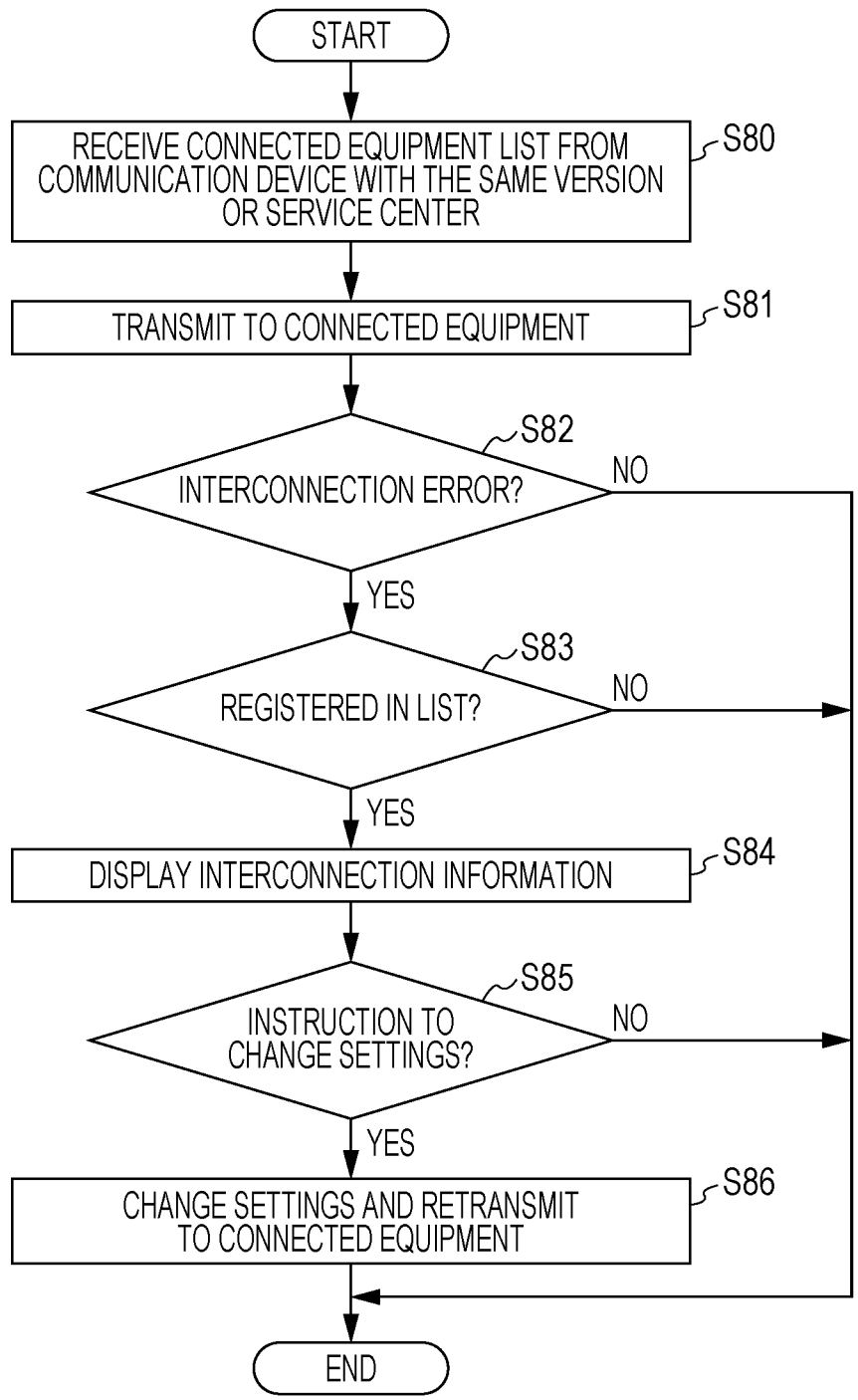
FIG. 17 is a flowchart illustrating operations according to a second exemplary embodiment.

FIG. 17 is a flowchart illustrating operations according to the second exemplary embodiment.

The communication device 7 receives connected equipment information from an external entity such as another communication device with the same version or a service center (S80). For example, the communication device 7 periodically receives a notification of interconnected equipment information about interconnection with the communication target device 4, and stores the received information in the storage 71 as the connected equipment list 711. In this way, the communication device 7 maintains up-to-date equipment information.

Next, the communication device 7 transmits a call control to the communication target device 4 (S81). The connection error detection unit 701 detects whether or not an interconnection error has occurred (S82). If an interconnection error is not detected (S82; No), the process ends.

If an interconnection error is detected (S82; Yes), it is determined whether or not the communication target device 4 is registered in the connected equipment list 711 of the communication device 7 (S83). If the communication target device 4 is not registered in the connected equipment list 711 (S83; No), the process ends.

If the communication target device 4 is registered in the connected equipment list 711 (S83; Yes), interconnection information is displayed by the display unit 706 (S84). This interconnection information also includes the connected equipment management list held by the communication management server 2 according to the first exemplary embodiment. Next, it is determined whether or not an instruction to change settings has been given (S85).

If an instruction to change settings has not been given (S85; No), the process ends. If an instruction to change settings has been given (S85; Yes), settings are changed in accordance with the instruction, and a call control is transmitted again to the communication target device 4 by the connection execution unit 700 (S86).

Effects of Second Exemplary Embodiment

According to the second exemplary embodiment, even if the communication device is a low-performance multifunction device, when an interconnection error occurs in the connection to a device that is the communication target of the communication device, an indication of whether or not the communication target device to connect with is connectable equipment is displayed, while in addition, a countermeasure for the interconnection error is presented. As a result, it becomes possible to improve response to version updates and situations of connection failures with equipment having a large number of connections. Particularly, in the second exemplary embodiment, since a communication management server is not accessed, the load on the system is decreased.

Note that the present invention is not limited to the foregoing exemplary embodiments, and that various modifications are possible within a scope that does not depart from the spirit of the present invention. For example, in the first exemplary embodiment discussed earlier, when a connection error with the communication target device 4 occurs, the connection availability query unit 304 of the communication device 3 queries the communication management server 2 by transmitting equipment information acquired from the communication target device 4, but the destination of the query is not limited to the communication management server 2. Instead of the communication management server 2, a query may be made to another communication device storing information related to connection availability with the communication target device 4 and procedures for connection errors.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication system comprising:
   a communication device including
      a processor programmed to, when a connection error between the communication device and a communication target device occurs, transmit error information including equipment information acquired from the communication target device, and
      a display that displays information related to a connection availability between the communication device and the communication target device and/or a procedure for the connection error;
   a communication management server including a processor programmed to receive the error information from the communication device and transmit a connection error inspection request; and
   an external entity configured to receive the connection error inspection request from the communication management server, perform an inspection regarding the connection error, and transmit an inspection result of the inspection to the communication management server, wherein
   the processor of the communication management server is further programmed to
      determine, based on the inspection result, whether a local fix is available in the communication device to resolve the connection error,
      in response to determining that the local fix is available, further determine whether the local fix includes a settings change or a version update,
      in response to determining that the local fix includes the settings change, transmit to the communication device information related to the settings change, and
      in response to determining that the local fix includes the version update, transmit to the communication device information related to the version update, and
   the processor of the communication device is further programmed to
      in response to receiving the information related to the settings change, temporarily change settings of the communication device and re-execute connection with the communication target device, and in response to receiving the information related to the version update, display the version update on the display of the communication device.

2. The communication system according to claim 1, wherein the processor of the communication management server is further programmed to, in response to determining that the local fix is unavailable, transmit to the communication device information related to the unavailability of the local fix, and the processor of the communication device is further programmed to, in response to receiving the information related to the unavailability of the local fix, display an indication that connection with the communication target device is unavailable.

3. A communication management server comprising:

a processor programmed to receive error information from a communication device for which a connection error occurs between the communication device and a communication target device, the error information including equipment information acquired by the communication device from the communication target device, transmit a connection error inspection request to an external entity, receive from the external entity an inspection result of an inspection regarding the connection error, determine, based on the inspection result, whether a local fix is available in the communication device to resolve the connection error, in response to determining that the local fix is available, further determine whether the local fix includes a settings change or a version update, in response to determining that the local fix includes the settings change, transmit to the communication device information related to the settings change such that the communication device temporarily changes settings of the communication device and re-executes connection with the communication target device, and in response to determining that the local fix includes the version update, transmit to the communication device information related to the version update such that the communication device displays the version update on a display of the communication device.

4. The communication management server according to claim 3, wherein the processor is further programmed to, in response to determining that the local fix is unavailable, transmit to the communication device information related to the unavailability of the local fix such that the communication device displays an indication that connection with the communication target device is unavailable.

* * * * *